United States Patent [19]

Bricher

[11] 3,918,052

[45] Nov. 4, 1975

[54] SHALLOW DISPLAY AND DIGITAL CLOCK INCLUDING REFLECTING AND MASKING MEANS

[76] Inventor: Kenneth J. Bricher, St. Paul, Minn. 55104

[22] Filed: July 26, 1974

[21] Appl. No.: 492,201

[52] U.S. Cl. ............. 340/366 E; 40/130 J; 340/336

[51] Int. Cl. ............................................. G09f 9/32

[58] Field of Search ............ 340/324 R, 336, 366 E, 340/378 A, 378 R; 40/28 B, 28 C, 130 J, 130 E, 132 D, 132 E

[56] References Cited

UNITED STATES PATENTS

| | | | |
|---|---|---|---|
| 1,668,449 | 5/1928 | Brackensey | 40/130 J |
| 1,701,204 | 2/1929 | Glatzner | 340/336 |
| 3,137,082 | 6/1964 | Phlieger, Jr. | 340/336 |
| 3,307,175 | 2/1967 | Shill | 340/336 |
| 3,568,177 | 3/1971 | Hasler | 340/324 R |
| 3,581,307 | 5/1971 | McKim et al. | 340/336 |
| 3,858,341 | 1/1975 | Wakabayashi et al. | 340/336 |

OTHER PUBLICATIONS

Specification Sheet for MM4314/MM5314 Digital Clock Chip; National Semiconductor Corp.; 1972.

*Primary Examiner*—Marshall M. Curtis
*Attorney, Agent, or Firm*—William L. Huebsch

[57] ABSTRACT

An electronically controlled display of the type in which digits are formed by illuminating select ones of a plurality of appropriately positioned light sources. Each of the light sources is located in a separate cavity defined by reflective wall surfaces. The reflective wall surfaces for each cavity have a novel configuration which causes light to be evenly projected through a flys-eye lens over an elongate rectangular light transmissive area in a face portion of the display with which the cavity communicates, even though the cavity extends only a short distance normally behind an outer viewed surface on the face portion; thereby facilitating use of the display in a wall mounted digital clock. The light source is centered along and spaced from one side of the elongate light transmissive area, and a parabolic wall surface around the light source directs light to an inclined wall surface extending between the light source and the edge of the light transmissive area opposite the light source to evenly spread the light and project it through the face portion.

10 Claims, 7 Drawing Figures

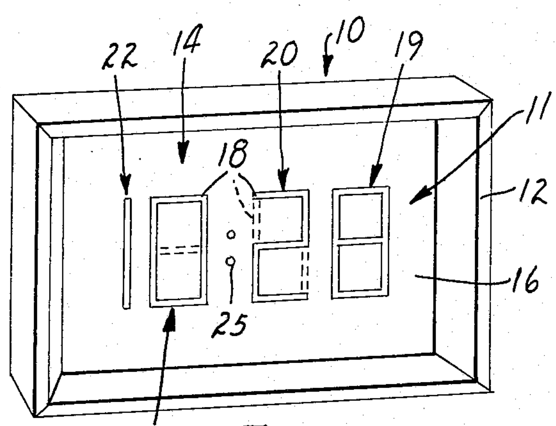
FIG. 1
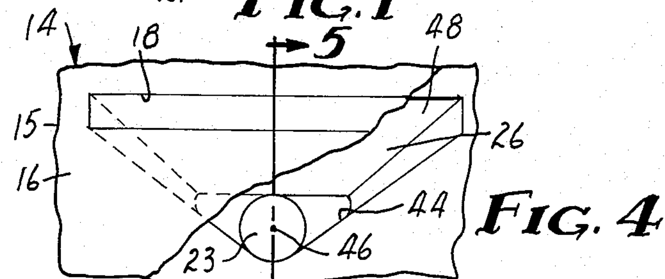
FIG. 4
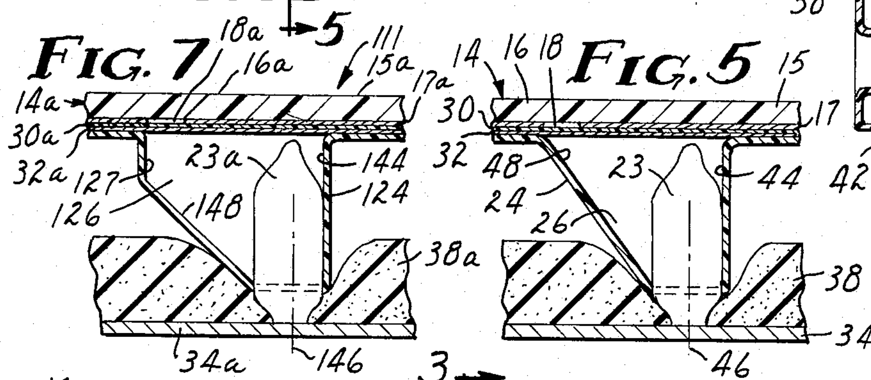
FIG. 7
FIG. 5
FIG. 3
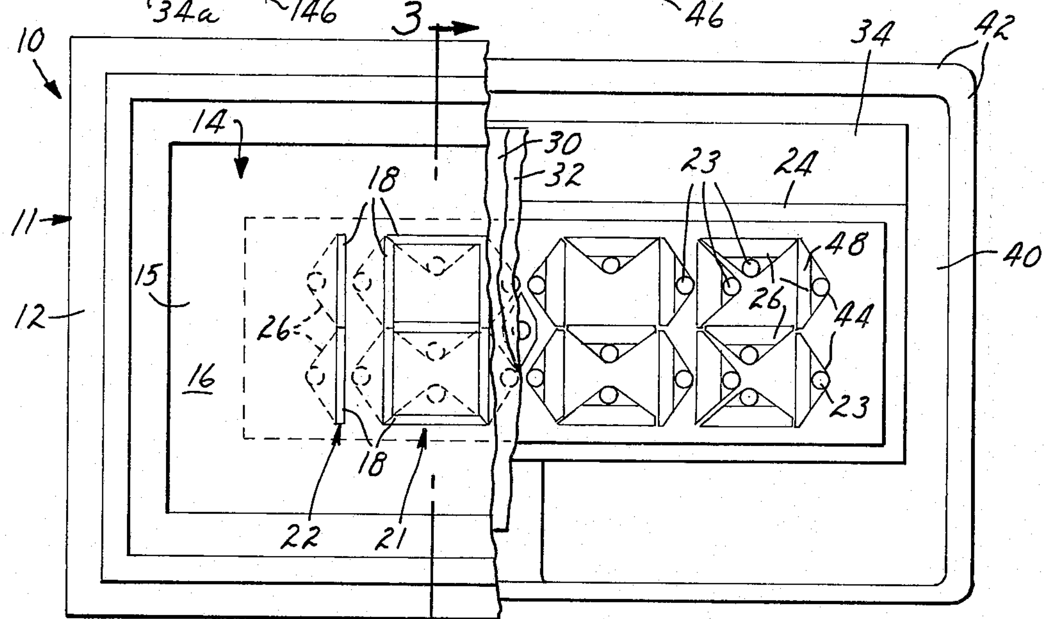
FIG. 2

TO EACH LAMP 23 IN THE MINUTE DISPLAY PORTION 19
TO EACH LAMP 23 IN THE 10 MINUTE DISPLAY PORTION 20
* TO THE CORRESPONDING LAMP 23 IN BOTH THE 10 MINUTE AND THE MINUTE DISPLAY PORTIONS 20 AND 19
110V
50
100
79

SHALLOW DISPLAY AND DIGITAL CLOCK INCLUDING REFLECTING AND MASKING MEANS

BACKGROUND OF THE INVENTION

1. Field of the Invention

The present invention relates to illuminated displays of the type in which light is projected onto or through a face portion of the display from a specially shaped light transmissive area behind the face portion.

2. Description of the Prior Art

Many electronically controlled displays are known in which characters are formed by projecting light onto or through light transmissive areas in a face portion of the display from selectively illuminated light sources behind the face portion. Typical of such displays are those suggested in U.S. Pat. Nos. 3,174,144, 3,210,876, 3,249,932, 3,307,175 and 3,581,307. Many of these patents suggest various means adapted for projecting light through elongate rectangular light transmissive areas arranged into what is termed a seven segment display (i.e., a display comprising seven elongate rectangular light transmissive areas through a face portion of the display arranged in the shape of a straight sided FIG. 8, and in which selective illumination of separate light sources for the light transmissive areas can project any numeral from 0 to 9). In each of the displays suggested in these patents, however, at least some of the light sources or bulbs are positioned generally centrally behind the light transmissive areas in the face portion of the display. In this position the bulb must be spaced a relatively large distance behind the viewed surface on the face portion to afford even distribution of light from the bulb over the light transmissive area, or else the bulb will produce uneven projection of light through the light transmissive area. Thus to provide projected light of an aesthetically appealing even intensity, such displays must be deeper behind the viewed surface on the face portion than may be desired for certain applications.

While certain other displays suggested by the prior art are able, through the use of specialized electronic illumination sources, to provide a display requiring little depth behind the viewing surface (see U.S. Pat. Nos. 2,922,993 and 3,675,065) the displays are more expensive than may be desired for certain applications.

SUMMARY OF THE INVENTION

A display according to the present invention includes means for uniformly projecting light from conventional sources of illumination through selected light transmissive areas in a face portion of the display while requiring relatively little depth behind the viewing surface. Thus the display is particularly useful where a relatively thin assembly is desirable such as in a wall mounted digital clock.

The display has walls with specularly reflective surfaces which help to define specially shaped light transmissive areas or cavities behind the face portion, each of which light transmissive cavities can evenly project light from a light source within the light transmissive cavity through an elongate rectangular light transmissive area through the face portion of substantially larger size than the light source; while the light transmissive cavity does not require substantially more depth behind the face portion than is required to accommodate the light source.

The wall surfaces defining each light transmissive cavity include the back surface of the face portion, and a reflective end surface which is approximately parabolic about an axis generally at a right angle to the viewed surface on the face portion, and which axis is centered along and spaced from one side of the elongate generally rectangular light transmissive area in the face portion with which the cavity communicates. The diverging ends of the parabolic wall surface extend to the ends of the light transmissive area. A generally planar reflective surface extends from a first edge of the elongate light transmissive area opposite the axis to its intersection with the parabolic end surface, and diverges with respect to the back surface of the face portion from the first edge of the light transmissive area. The light source is positioned at the axis of the parabolic end wall, and the reflective walls uniformly direct light from the light source through a flys-eye lens over the light transmissive area. This display structure provides greater uniformity of light projected through the light transmissive area in the viewed surface than can be provided by a light source which is centered and spaced a much larger distance behind the light transmissive area in the viewed surface within reflective walls that diverge to the light transmissive area (e.g., as with the bulb and reflector of a common flashlight), and does not produce the high directionality of light projected from the viewed surface which is produced by that arrangement. The display according to the present invention projects light through the light transmissive area so that the display can be easily read even though the line of sight deviates from a right angle to the viewed surface by over 60°

In one alternate embodiment of the present invention the walls defining the cavity in addition to the aforementioned configuration also include a reflective wall which extends a short distance at about a right angle behind the face portion between the first edge of the light transmissive area opposite the light source to the inclined wall. The display structure including this added wall provides a more even intensity of the projected light over the indicated viewing angles as the added wall directs more reflected light through the light transmissive area in the direction toward the light source.

The face portion of the display may be of layered construction, and when so formed preferably includes: (1) a stiff transparent outer mask layer coated on one surface with a layer of opaque paint except in predetermined elongate rectangular areas which define the light transmissive areas through the face portion; (2) a layer which is formed on one surface to provide the flys-eye lens for diffusing light and insuring that the rays of light which strike the surface portion from inside the light transmissive area are projected through the face portion; and (3) a transparent colored layer which restricts visual detection of a non-illuminated light transmissive area and thereby enhances the aesthetic appearance of the display. The colored layer is preferably about the same color as the light emitted by the light source. For example, when the light source is provided by a neon bulb which produces light of a deep orange color, the mask is also deep orange in color. This permits highly efficient transmission of orange light from the cavity when the bulb is lit. However, room light is restricted from entering the cavity and being reflected back out to a viewer to reveal the presence of a light transmissive area when the bulb is not lit, because only the orange spectrum of such room light can enter and be reflected.

Alternatively the face portion could be a single stiff transparent colored sheet formed on one surface with the "flys-eye lens" and coated with paint on the opposite surface to define the light transmissive areas.

The display according to the present invention is particularly adapted for providing a digital display including three seven segment digital display portions, including one for displaying minute periods, one for displaying 10 minute periods and one for displaying hour periods; with a fourth two segment display portion for displaying 10 hour periods and an illuminated colon between the hour and minute display portions. The display is preferably controlled by a solid state electronic circuit which properly illuminates the display portions to indicate the time of day while affording a thin package which complements the thin display structure, and includes novel switch means for setting the correct time on the display when the display is first activated.

BRIEF DESCRIPTION OF THE DRAWING

The present invention will be further described with reference to the accompanying drawing wherein like numbers refer to like parts in the several views, and wherein:

FIG. 1 is a perspective view of a digital clock including a display according to the present invention;

FIG. 2 is a vertical plan view of the clock of FIG. 1 with parts broken away to show details;

FIG. 3 is an enlarged sectional view taken approximately along the lines 3—3 of FIG. 2;

FIG. 4 is an enlarged fragmentary plan view, of a light transmissive area behind a face portion in the display of FIG. 1;

FIG. 5 is a sectional view taken approximately along the lines 5—5 of FIG. 4;

FIG. 7 is a sectional view of an alternate embodiment for the light transmissive area best seen in FIGS. 4 and 5.

DESCRIPTION OF THE PREFERRED EMBODIMENT

Figure 6:
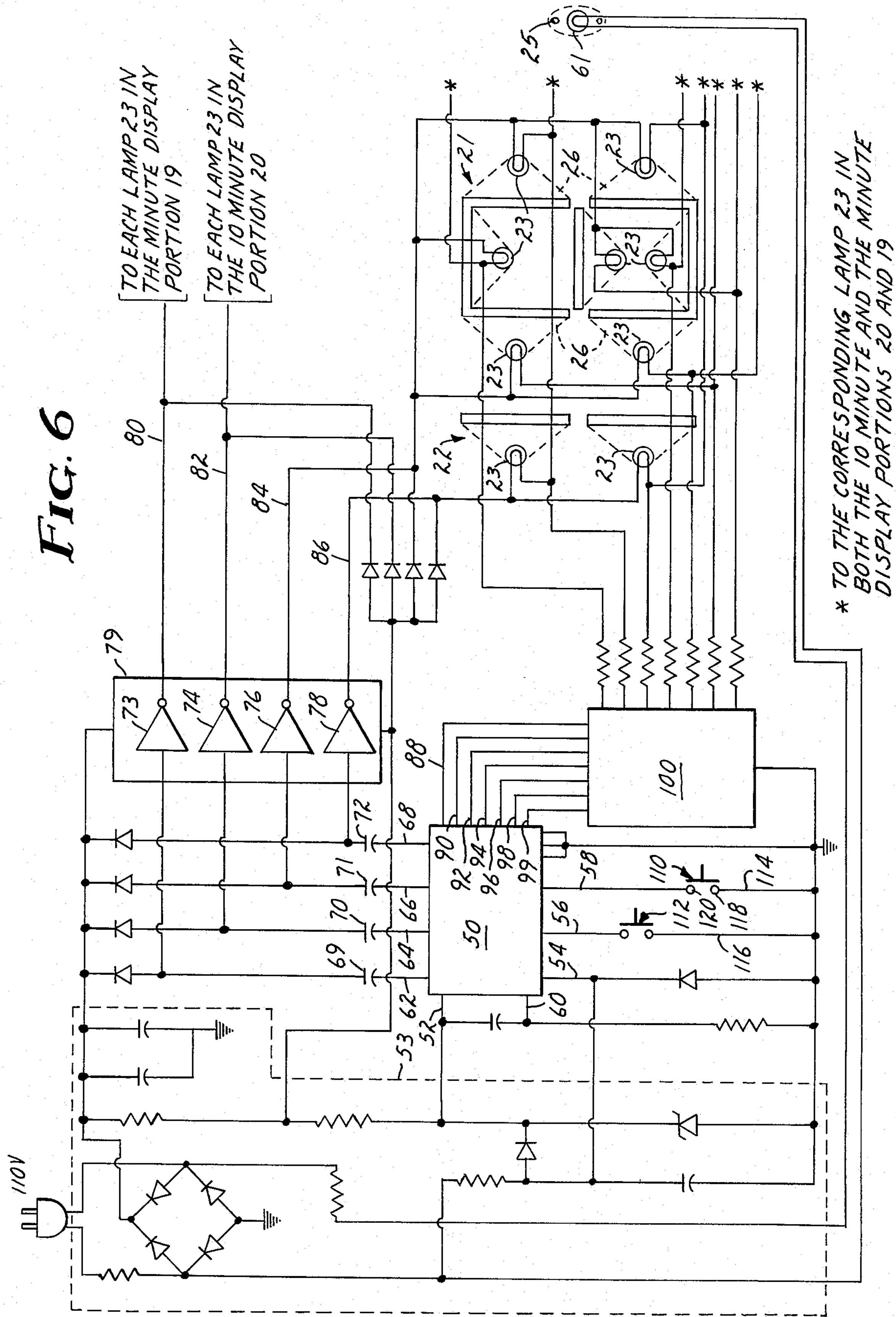
FIG. 6 is a block diagram of the circuit used to operate the display of FIG. 1.

Referring now to FIG. 1 of the drawing, there is illustrated a display according to the present invention incorporated in a digital clock 10 and generally designated by the numeral 11. The clock 10 is enclosed in a decorative frame 12 adapted to be hung on a wall. The frame 12 surrounds a face portion 14 for the display through which selectively illuminated sources of light in the display project light patterns in the shape of digits to indicate the time.

As is best seen in FIGS. 2, 3 and 5, the face portion 14 preferably includes an outer layer 15 of stiff transparent plastic material such as the polymethyl methacrylate, sold under the trade designation "Lucite" by E. I. du Pont de Nemours and Company, Inc., Wilmington, Delaware. The outer layer 15 has sufficient rigidity to define a planar viewed surface 16 for the display. The inner surface of the outer layer 15 is coated, as by silk screening, with an opaque layer of flat black paint 17 (FIG. 5) having sharply defined elongate rectangular openings defining light transmissive areas 18 through the face portion 14. A separate means for projecting light is mounted behind each of the light transmissive areas 18 and may be individually operated to project light through the light transmissive area 18 with which it communicates. As is best seen in FIG. 1, certain of the elongate rectangular light transmissive areas 18 are positioned with their ends adjacent to provide a first seven segment portion 19 of the display in the shape of a straight sided FIG. 8 for indicating the passage of minutes, a second seven segment portion 20 of the display for indicating the passage of 10 minute periods, a third seven segment portion 21 of the display for indicating hour periods, and a fourth two segment portion 22 of the display for indicating the passing of a ten hour period. A constantly illuminated colon 25 is also provided to separate the portions 21 and 22 of the display indicating hours from the portions 19 and 20 indicating minutes. The sources of illumination for the individual display segments are selectively controlled by electronic means (to be explained later) to provide an illuminated digital indication of the time through the face portion 14.

As is best seen in FIGS. 2 through 5 the means for projecting light behind each of the light transmissive areas 18 includes an elongate light source such as a neon lamp 23 for each light transmissive area 18; and a reflector 24 having a portion around each lamp 23 with specially shaped specularly reflective walls defining a light transmissive area or cavity 26 behind the face portion 14 which can uniformly project light from the lamp 23 it contains through the light transmissive area 18 with which it communicates.

The layered face portion 14 also includes a colored transparent sheet 30 such as of polyester (FIG. 5) between the outer layer 15 and the reflector 24. The transparent sheet 30 has a dark color approximately the same as the color of the light produced by the lamps 23 (e.g., dark orange). The sheet 30 provides means for affording efficient transmission of light from each cavity 26 through its associated light transmissive area 18, while restricting entrance and reflection of room light by the reflector 24. Preferably the face portion 14 also includes a lens sheet 32 of material formed on one surface with a pattern called a "flys-eye lens", such as the material available from Rowland Products, Inc., of Kensington, Conn., and commercially designated "Rowlux". The lens sheet 32 is sandwiched between the reflector 24 and colored sheet 30 to provide means for diffusing any local irregularities in light intensity produced by surface irregularities in the reflector 24, and for insuring that the rays of light that strike the surface portion at the light transmissive areas 18 from inside the cavities 26 will be projected through the face portion 14.

As is best seen in FIG. 3, the lamps 23 are supported via their electrical leads on a printed circuit board 34 to which are attached the components in the electronic control means for the display (not shown in FIG. 3). The lamps 23 project into the cavities 26 through openings in the reflector 24 and aligned openings in a gasket 38. The gasket 38 is of a resilient compressible material, (such as of polyurethane foam) and is compressed between the reflector 24 and the printed circuit board 34 to restrict leakage of light from the cavities 26, and to press the reflector 24 against the face portion 14 which face portion 14 is retained in an edge receiving groove 39 around the inside of the frame 12 adjacent its front surface. The printed circuit board 34 is attached as by screws within a dish-like stiff flexible molded back plate 40 having a peripheral lip 42 attached as by brads in a groove around the back surface of the frame 12.

FIGS. 4 and 5 best illustrate the novel structure of the portions of the reflector 24 defining the cavities 26. The cavities 26 are compact in a direction normal to the viewed surface of the face portion 14, and provide a highly efficient and even distribution of light projected through the elongate rectangular light transmissive areas 18. The reflector 24 is preferably of a stiff plastic material which is vacuum formed or injection molded to provide walls with surfaces defining a plurality of the cavities 26, with each cavity 26 being properly positioned to direct light through an associated one of the elongate rectangular light transmissive areas 18 in the face portion 14. The wall surfaces defining each cavity 26 are coated with a bright metal, as by vapor coating with aluminum, so as to be substantially specularly reflective. The wall surfaces for each cavity 26 include an end surface 44 which is approximately parabolic about an axis 46 generally at a right angle to the viewed surface 16 of the face portion 14, and which is centered along and spaced from one side of the light transmissive area 18 through which light from the cavity 26 may be directed, with the diverging ends of the parabolic end surface 44 extending to the ends of the elongate light transmissive area 18. A generally planar wall surface 48 intersects the inner surface of the face portion 14 at the edge of the associated light transmissive area 18 opposite the axis 46, and diverges therefrom at an included angle of between about 30°to 60°(preferably 45 degrees) with the viewed surface 16 of the face portion 14, extending behind the associated light transmissive area 18 and intersecting the parabolic end surface 44. The circular opening for the lamp 23 positioned in each cavity 26 is coaxially aligned with the axis 46, so that the generally elongate light source (i.e., the illuminating portion of the lamp 23) is positioned along the axis 46 of the parabolic end surface 44. With this configuration, light from the lamp 23 is evenly projected by the end surface 44 onto the planar surface 48, and light reflected from the surface 48 is projected through the associated light transmissive area 18 to afford reading the display 11 even though the line of sight deviates from a right angle with the viewed surface 16 by up to 60°.

As an example, a cavity 26 in a reflector 24 about 0.4 inch deep in a direction normal to the viewed surface 16 of the display 11 can evenly project light through a light transmissive area 18 about ⅛ inch wide and 1-¼ inch long from an axis 46 spaced about 0.3 inch from the adjacent side of the light transmissive area 18.

FIG. 7 illustrates an alternate embodiment of a display 111 according to the present invention having parts similar to parts in the display 11 similarly numbered. The display 111 includes a reflector 124 which is similar to the reflector 24, but has an added reflective wall surface 127 which will produce a more even intensity of projected light over the various angles from which a viewed surface 16*a* of the display 111 is designed to be viewed (i.e., lines of sight which deviate from a right angle to the viewed surface 16*a* by up to at least 60°).

Similar to the display 11, the display 111 has an elongate lamp 23*a* on a printed circuit board 34*a* which projects through a compressible gasket 38*a* into a cavity 126 in the reflector 124. The cavity 126 communicates with and is especially designed to project light through an elongate rectangular light transmissive area 18*a* defined by an opening in an opaque paint layer 17*a* on a stiff transparent plastic sheet 15*a*. The sheet 15*a* is spaced from the reflector 124 by a colored sheet 30*a* and a diffusing lens sheet 32*a* , with the sheet 15 *a* , paint layer 17*a* , colored sheet 30*a* and lens sheet 32 providing a face portion 14*a* for the display 111.

Like the deflector 24, the wall surfaces of the reflector 124 which define the cavity 126 are generally specularly reflective. The reflective wall surfaces include an end surface 144 which is approximately parabolic about an axis 146 along which the lamp 23*a* is positioned with the axis 146 being spaced from one side of the light transmissive area 18*a*, and a generally planar wall surface 148. The planar surface 148 extends from directly behind the edge of the rectangular light transmissive area 18*a* opposite the axis 146, and diverges therefrom at an included angle of between about 30° to 60° with the viewed surface 16*a*, extending behind the light transmissive area 18*a* and intersecting the parabolic end surface 144. The added reflective wall surface 127 extends a short distance at a right angle to the viewed surface 16*a* and parallel to the axis 146 between the face portion 14*a* at the edge of the light transmissive area 18a opposite the axis 146 to its intersection with the planar wall surface 148. The added surface 127 provides more direct reflection to direct light through the light transmissive area 18*a* in a direction toward the axis 146 to supplement light reflected in that direction by the planar wall surface 148, providing a more equivalent intensity between light reflected in that direction, light reflected through the light transmissive area 18*a* at a right angle to the viewed surface 16*a* by the planar surface 148, and light reflected through the light transmissive area 18*a* away from the axis 146 by both the parabolic surface 144 and the planar surface 148.

FIG. 6 is a block diagram of an electronic circuit used for selectively energizing the lamps 23 positioned within the cavities 26 in the display 11. The basic component of the circuit is an integrated digital clock circuit 50, such as that manufactured by the National Semiconductor Corp., and commercially designated the Model MM 5314N. The digital clock circuit 50 comprises a monolithic MOS wafer utilizing P-channel enhancement mode low threshold technology, and provides the necessary logic to drive a four digit, twelve hour digital display from a 60 Hz input. Inputs to the clock circuit 50 include a DC power input on lead 52 which DC power is readily obtained by conventional rectification circuit within power supply 53, energized by a conventional 110 VAC 60 Hz supply, a timing pulse input on lead 54 derived from the AC power input to the power supply 53, fast and slow time setting inputs on leads 56 and 58 respectively, and a multiplex oscillator frequency control on lead 60. A pilot light 61 energized by the AC power supply is positioned between the minutes and hours portions of the display to continuously illuminate the colon 25 therebetween. Typical circuits providing the requisite signals at the various inputs are suggested in manufacturer's brochures describing such integrated clock circuits and are known to those skilled in the art. The integrated clock circuit 50 includes a multiplex oscillator which samples the outputs from minutes and hours counters in the circuit and routes the samples output to a read only memory also within the circuit programmed to provide outputs for seven segment displays. The multiplex oscillator is further coupled to a frequency divider and thence to digit enable outputs 62, 64, 66 and 68, which selectively activate the minutes and hours portions of the displays 19, 20, 21 and 22 respectively. The signals from the digit enable outputs 62, 64, 66 and 68 are AC coupled through capacitors 69, 70, 71 and 72 to integrated circuit amplifiers 73, 74, 76 and 78 respectively, which amplifiers are preferably two state digital switches to drive the display lamps 23. Preferably, the amplifiers, 73, 74, 76 and 78 are contained within a single integrated circuit 79 such as Sprague Electric Co. Model UHP-495. The output of the amplifier 73 is coupled via lead 80 to a common terminal for all of the lamps 23 within the first or minute portion 19 of the display (not shown); the output of the amplifier 74 is coupled via lead 82 to a common terminal for all of the lamps 23 within the second or ten minute portion 20 of the display (not shown); the output of the amplifier 76 is coupled via lead 84 to a common terminal for all of the lamps 23 within the third or hour portion 21 of the display as illustrated; and the output of the amplifier 78 is coupled via lead 86 to a common terminal for all of the lamps 23 within the fourth or ten hour portion 22 of the display as illustrated.

In similar fashion, multiplexed seven segment display outputs 88, 90, 92, 94, 96, 98, and 99 of the digital clock circuit 50 are each coupled through individual stages within a high voltage display driver amplifier 100, the output of each stage being coupled in common to the lamps 23 in the corresponding positions in the seven segment display portions 19, 20, and 21, (e.g., with the output of the amplifier 100 which corresponds to the output 88 being coupled to the top horizontal segment in each display 19, 20, and 21, the output of the amplifier 100 which corresponds to the output 90 being coupled to the upper right hand vertical segment in each display etc.) and two of the outputs of the amplifier 100 corresponding to the outputs 90 and 92 also being coupled respectively to the upper and lower vertical segments of the fourth display portion 22. The driver amplifier 100 preferably comprises a single bipolar monolithic integrated circuit such as Sprague Electronics Co. Model UHP 481, which circuit is expressly designed for interfacing between MOS logic circuits and gas discharge displays. Additional details relating to the interconnection between such circuits are fully recited in the manufacturer's brochures and are well known to those skilled in the art.

The lamps 23 may be conventional neon indicator lamps such as NE-51H. It has been found, however, that the rapid switch on and off of the lamp 23 as a result of the multiplexing in the digital clock circuit 50 materially reduces the lifetime of such standard lamps. Accordingly, special lamps containing a higher pressure gas fill have been found preferable.

The display also includes two normally open switches 110 and 112 which are manually operable to set the digits on the display to a desired value. The switch 110 is coupled between a lead 114 and the lead 58 to the slow time setting input to the clock circuit 50, and the switch 112 is coupled between a lead 116 and the lead 56 to the fast time setting input to the clock circuit 50. The switches 110 and 112 are essentially identical in their structure and operation. Thus only the switch 110 will be described in detail.

As is best seen in FIGS. 3 and 6 the switch 110 includes two spaced contacts 118 and 120 coupled respectively to the leads 114 and 58, and mounted on the printed circuit board 34 (FIG. 3) which provides means for rigidly supporting the contacts 118 and 120. A rigid conductive contact plate 122 is mounted on the back plate 40 adjacent and normally spaced from the contacts 118 and 120. A resilient flexible and compressible pad 124 having adhesive on both its major surfaces (e.g., the double cooated foam tape sold by Minnesota Mining and Manufacturing Company of St. Paul, Minnesota) attaches the contact plate 122 to the inner surface of the flexible back plate 40 and electrically insulates it therefrom. By pressing on the outer surface of the back plate 40 in a dished portion 126 thereof (provided to afford ease of location of the switch and a desired normal spacing for the plate 122 from the contacts 118 and 120) the dished portion 126 of the back plate 40 can be manually deflected toward the printed circuit board 34 to bring the contact plate 122 into physical and electrical contact across the contacts 118 and 120, thereby electrically connecting the lead 114 to the lead 58. Thus the back plate 40 provides means for mounting the contact plate 122 for movement relative to the contacts 118 and 120 between a normal position spaced from the contacts 118 and 120 and a closed position in engagement with the contacts 118 and 120, and means for biasing the contact plate 122 to its normal position.

As the plate 122 is moved to its contact position, the flexible pad 124 can allow movement of the contact plate 122 relative to the back plate 40 and contacts 118 and 120 to provide means for bringing the plate into proper alignment for electrical contact between the contacts 118 and 120. Thus the switch 110 provides a reliable and inexpensive switch structure for manually setting the time on the clock 10.

The term flys-eye lens as used herein means a sheet having at least one surface formed with a regular close packed array of hemispheric lenticular elements all of which have the same focal length and aperture.

I claim:

1. A display comprising:

a face portion having a viewed surface, a back surface opposite said viewed surface, means for providing a barrier to the transmission of light between said surfaces having at least one opening defining elongate generally rectangular light transmissive area through said face portion, and a surface formed as a flys-eye lens over said light transmissive area; walls having generally specularly reflective surfaces defining, with said back surface, a light transmissive cavity communicating with said light transmissive area, said reflective surfaces including an end surface which is approximately parabolic about an axis at a right angle to said surfaces and which axis is centered along and spaced from one side of said elongate light transmissive area with said end surface extending to the ends of said elongate area, and a generally planar rear surface extending from the side of said elongate light transmissive area opposite said axis to an intersection with said end surface and diverging with respect to said back surface from said side of the elongate light transmissive area opposite said axis at an included angle with said viewed surface of between about 30 to 60 degrees;

a lamp in said cavity at said axis; and electronic means for selectively activating said lamp.

2. A display according to claim 1, wherein said reflective surfaces further include a generally planar reflective surface parallel with said axis between the back surface at the side of said elongate light transmissive area opposite said axis and said generally planar rear surface.

3. A display according to claim 1, wherein said lamp, when illuminated, produces light of a predetermined color, and said face portion includes means for restricting transmission of light of other than said predetermined color through said light transmissive area.

4. A display according to claim 1, wherein said rear surface is disposed at an included angle with said viewed surface of about 45°.

5. A display according to claim 1, wherein said lamp, when illuminated, produces light of a predetermined color, and said face portion is of a layered construction comprising a stiff transparent layer with an opaque coating of paint on one surface having an opening defining said light transmissive area; a transparent layer having a color approximately the same as said predetermined color; and a layer having said surface formed as a flys-eye lens.

6. A display comprising:

a face portion having a viewed surface, a back surface opposite said viewed surface, and means for providing a barrier to the transmission of light between said surfaces having at least one opening defining an elongate generally rectangular light transmissive area through said face portion;

walls having generally specularly reflective surfaces defining, with said back surface, a light transmissive cavity communicating with said light transmissive area, said reflective surfaces including an end surface which is approximately parabolic about an axis at a right angle to said surfaces and which axis is centered along and spaced from one side of said elongate light transmissive area with said end surface extending to the ends of said elongate area, a generally planar rear surface extending from the side of said elongate light transmissive area opposite said axis to an intersection with said end surface and diverging with respect to said back surface from said side of the elongate light transmissive area opposite said axis at an included angle with said viewed surface of between about 30° to 60°, and a generally planar reflective surface parallel with said axis between the back surface at the side of said elongate light transmissive area opposite said axis and said generally planar rear surface;

a lamp in said cavity at said axis; and electronic means for selectively activating said lamp.

7. A display according to claim 6, further including a surface formed as a flys-eye lens over said light transmissive area.

8. A display according to claim 6, wherein said lamp, when illuminated, produces light of a predetermined color, and said face portion includes means for restricting transmission of light of other than said predetermined color through said light transmissive area.

9. A display according to claim 6, wherein said lamp, when illuminated, produces light of a predetermined color, and said face portion is of a layered construction comprising a stiff transparent layer with an opaque coating of paint on one surface having an opening defining said light transmissive area; a transparent layer having a color approximately the same as said predetermined color over said light transmissive area; and a layer having a surface formed as a flys-eye lens over said light transmissive area.

10. A digital clock including:

a display comprising a plurality of display portions having segments, including three display portions each having seven segments disposed in the shape of a straight sided figure 8, with each of said segments comprising:

a face portion having a viewed surface, a back surface opposite said viewed surface, means for providing a barrier to the transmission of light between said surfaces having an opening defining an elongate generally rectangular first light transmissive area through said face portion, means for restricting transmission of light of other than a predetermined color through said first light transmissive area, and a surface formed as a flys-eye lens across said first light transmissive area;

walls having generally specularly reflective surfaces defining, with said back surface, a second light transmissive area behind said face portion and communicating with said first light transmissive area, said reflective surfaces including an end surface which is approximately parabolic about an axis at a right angle to said viewed surface and which axis is centered along and spaced from one side of said first light transmissive area, with said end surface extending to the ends of said first light transmissive area, and a generally planar rear surface extending from behind the side of said first light transmissive area opposite said axis to an intersection with said end surface and diverging with respect to said viewed surface from the side of said first elongate light transmissive area opposite said axis at an included angle with said viewed surface of between about 30° to 60°; and a lamp in said second light transmissive area at said axis providing, when activated, a light of said predetermined color; and a solid state electronic circuit for selectively activating the lamps in said segments to indicate the time of day.

* * * * *